United States Patent
Kim et al.

(10) Patent No.: US 6,753,382 B2
(45) Date of Patent: Jun. 22, 2004

(54) METHOD FOR PREPARING ACRYLONITRILE-BUTADIENE-STYRENE LATEX HAVING HIGH TOTAL SOLID CONTENT

(75) Inventors: Geon-Soo Kim, Yeocheon (KR);
Chan-Hong Lee, Yeocheon (KR);
Byung-Tae Yang, Yeocheon (KR);
Joo-Byung Chai, Yeocheon (KR)

(73) Assignee: LG Chemical Co., Ltd., Seoul (KR)

( * ) Notice: Subject to any disclaimer, the term of this patent is extended or adjusted under 35 U.S.C. 154(b) by 0 days.

(21) Appl. No.: 10/168,735

(22) PCT Filed: Nov. 9, 2001

(86) PCT No.: PCT/KR01/01913

§ 371 (c)(1),
(2), (4) Date: Jul. 22, 2002

(87) PCT Pub. No.: WO02/38641

PCT Pub. Date: May 16, 2002

(65) Prior Publication Data

US 2003/0114580 A1 Jun. 19, 2003

(30) Foreign Application Priority Data

Nov. 10, 2000 (KR) ........................................ 2000/66791

(51) Int. Cl.$^7$ ............................................. C08F 279/04
(52) U.S. Cl. ....................... 525/316; 525/258; 525/261; 525/262; 525/942; 526/911
(58) Field of Search ................................ 525/258, 261, 525/262, 316, 942; 526/911

(56) References Cited

U.S. PATENT DOCUMENTS 3,624,183 A * 11/1971 Leach et al. ............. 525/942 X
6,506,845 B1 * 1/2003 Yoo et al. ............... 525/942 X

FOREIGN PATENT DOCUMENTS

| CN | 1188118 | 7/1998 |
|----|---------|--------|
| JP | 54-133588 A | 10/1979 |
| JP | 9-003142 A | 1/1997 |
| JP | 9-296015 A | 1/1997 |

OTHER PUBLICATIONS

English Language Translation of JP 09–296015, published Nov. 18, 1997.*

* cited by examiner

Primary Examiner—Fred Teskin
(74) Attorney, Agent, or Firm—Birch, Stewart, Kolasch & Birch, LLP

(57) ABSTRACT

The present invention relates to a method of acrylonitrile-butadiene-styrene (ABS) rubber latex, and the acrylonitrile-butadiene-styrene (ABS) latex is prepared by graft-polymerizing butadiene rubber with the monomers of acrlylonitrile and styrene through emulsion-polymerization, so that the ABS rubber latex of the present invention has high solid content. The method of ABS rubber latex of the present invention comprises the step of emulsion-polymerizing i) polybutadiene rubber latex; ii) aromatic vinyl compound; and iii) vinyl cyanide with the addition of a reactive emulsifier. According to the method of the present invention, the ABS rubber latex has high solid content due to a decrease in the amount of coagulated materials and film, which formed on the rubber latex during polymerization, and an increase in the production volume.

14 Claims, No Drawings

METHOD FOR PREPARING ACRYLONITRILE-BUTADIENE-STYRENE LATEX HAVING HIGH TOTAL SOLID CONTENT

This application is the national phase under 35 U.S.C. §371 of PCT International Application No. PCT/KR01/01913 which has an International filing date of Nov. 9, 2001, which designated the United States of America.

CROSS REFERENCE TO RELATED APPLICATION

This application is based on application No. 2000-66791 filed in the Korean Industrial Property Office on Nov. 10, 2000, the content of which is incorporated hereinto by reference.

BACKGROUND OF THE INVENTION (a) Field of the Invention

The present invention relates to a method for preparing acrylonitrile-butadiene-styrene (ABS) latex, and more particularly, to a method for preparing acrylonitrile-butadiene-styrene having high total solid content through emulsion polymerization of the styrene monomer in order to graft-copolymerize the styrene monomer.

(b) Description of the Related Art

Since an acrylonitrile-butadiene-styrene (ABS) resin has excellent characteristics such as impact resistance, chemical resistance, workability, and surface gloss, it is generally used in monitor housing, computer game-player housing, home appliances, and office machines, and as the use of the ABS resin is increasing, its production also needs to be increased. However, in order to increase the production volume of the ABS resin, it does not help that new equipment for its production is added to the existing facilities. In order to solve the said problem, it has been studied that the production volume of the ABS resin increases by shortening the processing time with a shorter reaction time, an increase in the rubber content of latex, a decrease in the rubber content of the final ABS injection molding products and extrusion products, or an increase in the total solid content of latex.

In particular, though the production volume of the ABS resin is capable of increasing by increasing the total solid content of latex in a lab test, the productivity decreases on real processes, because coagulated materials generates due to the shear stress of the stirrer, and time is needed to remove the film which is formed on the latex surface during its transportation or storage.

SUMMARY OF THE INVENTION

It is an object of the present invention to provide a method for preparing acrylonitrile-butadiene-styrene latex having a high total solid content.

It is another object to provide a method for preparing acrylonitrile-butadiene-styrene latex having a high total solid content, which is capable of increasing in the production volume by decreasing the amount of coagulated materials which are generated during graft-copolymerization, or the film which is formed on the latex surface.

These objects may be achieved by a preparation method of the acrylonitrile-butadiene-styrene having a high total solid content, which comprises a step of emulsion polymerization of:

i) polybutadiene rubber latex;
ii) an aromatic vinyl compound; and
iii) vinyl cyanide with the addition of a reactive emulsifier thereto.

DETAILED DESCRIPTION OF THE INVENTION

In the following detailed description, only the preferred embodiment of the invention has been shown and described, simply by way of illustration of the best mode contemplated by the inventors of carrying out the invention. As will be realized, the invention is capable of modification in various obvious respects, all without departing from the invention. Accordingly, the description is to be regarded as illustrative in nature, and not restrictive.

The acrylonitrile-butadiene-styrene latex of the present invention is prepared by the addition of an aromatic vinyl compound and a vinyl cyan compound to polybutadiene rubber latex, and emulsion copolymerization of the mixture with the addition of a reactive emulsifier, in order to decrease in the amount of coagulated materials which are generated during the emulsion copolymerization, and to prevent the film from being formed on the latex surface. Thus, the acrylonitrile-butadiene-styrene rubber latex has high productivity and total solid content of the latex.

In order to obtain the latex of the present invention, the acrylonitrile-butadiene-styrene latex is prepared by the emulsion compolymerization of:

i) 40 to 70 parts by weight of polybutadiene rubber latex;
ii) 15 to 30 parts by weight of aromatic vinyl compound; and
iii) 10 to 25 parts by weight of vinyl cyanide with the addition of 0.01 to 4.0 weight parts of reactive emulsifier thereto.

The polybutadiene rubber latex of i) is a rubber latex mixture comprising:

a) a large-diameter-polybutadiene rubber latex having a high gel content, which has a particle diameter ranging from 2600 to 5000 Å in an average diameter, the gel content ranging from 70 to 95%, and swelling index ranging from 12 to 30; and b) a large-diameter-polybutadiene rubber latex having low gel content, which has a particle diameter ranging from 2600 to 5000 Å in an average diameter, the gel content ranging from 60 to 85%, and swelling index ranging from 18 to 40, and more preferably, the large-diameter-polybutadiene rubber latex having high gel content of a) and large-diameter-polybutadiene rubber latex having low gel content of b) are mixed in a weight ratio of 10~50 to 50~10.

In order to perform the emulsion copolymerization efficiently, the aromatic vinyl compound and vinyl cyan compound are twice added to the mixture of rubber latex as monomers. In the first addition, 25 to 80 parts by weight of the monomers based on 100 parts by weight of the total monomers are added, and 75 to 20 parts by weight of the monomers, the remaining monomers, are added in the second addition.

That is, the acrylonitrile-butadiene-styrene latex is prepared by the steps comprising:

a) placing 40 to 70 parts by weight of the rubber latex mixture of i); 3.75 to 24 parts by weight of the aromatic vinyl compound monomer of ii); 2.5 to 20 parts by weight of the vinyl cyan compound monomer; and equal to or less than 4 parts by weight of the reactive emulsifier together in a reactor in order to react the materials first;

b) adding 6 to 26.25 parts by weight of the aromatic vinyl compound monomer of ii); 5 to 22.5 parts by weight of the vinyl cyan compound monomer of iii); and 0.01 to 4 parts by weight of the reactive emulsifier agent together or continuously to the materials of a) in order to react the mixture secondly, 30 to 90 minutes after the first reaction in the step a), and when the conversion ratio of monomers of ii) and iii) to polymers ranges from 40 to 90 wt %.

The reactive emulsifier of the present invention includes anionic emulsifiers comprising allyl, methacryloyl, and propenyl groups, or neutral emulsifier.

An exemplary anionic emulsifier agent comprising an allyl group includes sulfate of polyoxyethylene allylglycidyl nonylphenyl ether, and ADEKARIA SOAP SE based agents (a product by Asahi Denka Co.) which is suitable for a commercial market. The neutral emulsifier agent comprising an allyl group includes polyoxyethylene allylglycidyl nonylphenyl ether based emulsifiers, and ADEKARIA SOAP NE based emulsifier (a product by Asahi Denka Co.) which is suitable for a commercial market. The anionic emulsifier comprising (metha)acryloile group includes ELEMINOL RS based emulsifiers (a product by Sanyo kasei Co.), and the neutral emulsifier comprising the (metha)acryloile group includes RMA-560 based emulsifiers (a product by Nippon Surfactant Co.). An exemplary anionic emulsifier comprising the propenyl group includes polyoxyethylene nonyl propenyl ether ammonium sulfate, and AQUARON BC based emulsifiers (a product by Daiichi kogyo Seiyaku Co.) which is suitable for a commercial market. The reactive emulsifier of the present invention may be selected from the group consisting of the aforementioned agents, or may include a mixture of the aforementioned emulsifier and the non-reactive emulsifier.

Preferably, 0.01 to 4.0 parts by weight of the reactive emulsifier based on 100 parts by weights of the ABS is added to the reactive materials during emulsion copolymerization, and more preferably, equal to or less than 2 parts by weight of the reactive emulsifier is added. When equal to or more than 4.0 parts by weight of the reactive emulsifier is added, agglutination of the small-diameter-latex polymer may be bad, and when equal to or less than 2.0 parts by weight of the reactive emulsifier is added, few agglutination of the small-diameter-latex may be occurred.

It is preferable that 0.1 to 2.0 parts by weight of the non-reactive emulsifier is added to the reactive materials, and it may be one or more selected from the group consisting of alkylaryl sufonate, alkalimethylalkyl sulfate, sulfonated alkylester, soap, and alkali rosinate.

The acrylonitrile-butadiene-styrene latex is also prepared by adding a conventional molecular weight controller and an initiator that is used in emulsion copolymerization.

It is preferable that 0.2 to 1.0 parts by weight of the molecular controller is added during copolymerization, and the molecular weight controller includes tertiary dodecyl mercaptane preferably.

In addition, it is preferable that 0.05 to 0.5 parts by weight of the initiator is added during copolymerization, and the initiator includes the mixture of one or more peroxides selected from the group consisting of tertiary butyl hydro peroxide, cumenehydro peroxide, diisopropyl benzenehydro peroxide, and persulfate; and one or more reductants selected from the group consisting of sodiumadidehyde sulfoxylate, sodiumethylene diamine tetraacetate, ferrous sulfate, dextrose, sodium pyrroline, and sodium sulfite.

The emulsion polymerization of the present invention is preferably performed at a temperature ranging from 40 to 80° C. for 2 to 7 hours.

Hereinafter, the large-diameter-polybutadiene rubber latex having high gel content and the large-diameter-polybutadiene rubber latex having low gel content will be mentioned.

The polybutadiene rubber latex of a) is preferably prepared by a step comprising the agglutination of a small-diameter-rubber latex polymer having an average diameter-rubber latex polymer with an average diameter ranging from 70 to 95%, and a swelling index ranging from 12 to 30 with an acetic acid.

The small-diameter rubber latex polymer is preferably prepared by the steps comprising:

a) placing 100 parts by weight of 1,3-butadiene; 1 to 4 parts by weight of the non-reactive emulsifier; 0.1 to 0.6 parts by weight of the initiator; 0.1 to 1.0 parts by weight of an electrolyte; 0.1 to 0.5 parts by weight of the molecular weight controller; and 90 to 130 parts by weight of ion-exchange water all together in a reactor in order to react the reactants at a temperature ranging from 50 to 65° C. for 7 to 12 hours; and b) adding 0.05 to 1.2 parts by weight of the molecular weight controller to the reactants of a) in order to react the reactants at the temperature ranging from 55 to 70° C. for 5 to 15 hours.

In addition, the large-diameter-polybutadiene rubber latex having low content of gel of i) b) is preferably prepared by the steps comprising:

a) placing 50 to 100 parts by weight of conjugated diene compound monomer; 1 to 4 parts by weight of non-reactive emulsifier; 0.2 to 1.5 parts by weight of the initiator; 0.5 to 2 parts by weight of an electrolyte; 0.1 to 0.5 parts by weight of the molecular weight controller; and 75 to 100 parts by weight of the ion-exchange water all together in a reactor in order to react the reactants at a temperature ranging from 65 to 75° C. for 4 to 15 hours;

b) adding the rest of the conjugated diene compound monomer; and 0.1 to 1.0 parts by weight of the molecular weight controller all together or continuously to the reactants in order to react further the mixture at a temperature ranging from 70 to 85° C. for 10 to 20 hours;

c) adding 0.01 to 3.0 parts by weight of the reactive emulsifier agent to the mixture, when the conversion of monomer to polymer due to the reaction in the step b) ranges from 30 to 70 wt %; and d) adding a prohibitor to the resulting material in order to complete the polymerization reaction, when the conversion of monomer to polymer due to the reaction in the step c) ranges from 80 to 95 wt %.

The non-reactive emulsifier which is used for the preparation of the large-diameter-polybutadiene latex having high gel content, the small-diameter-polybutadiene latex having high gel content, and the polybutadiene latex having low gel content may include one or more selected from the group consisting of alkylaryl sulfonate, alkalimethyl alkyl sulfate, sulfonated alkylester, fatty acid soap, and alkali rosinate.

The initiator includes one or more selected from the group consisting of water-soluble persulfate such as sodium persulfate and potassium persulfate; fat-soluble initiator such as cumenehydro peroxide, diisopropyl benzenhydro peroxide, azobis isobutylnitrile, tertiary butylhydro peroxide, p-methanehydro peroxide, and benzoylperoxide; and redox systematic initiator.

The electrolyte includes one or more selected from the group consisting of KCl, NaCl, $KHCO_3$, $NaHCO_3$, $K_2CO_3$, $Na_2CO_3$, $NaHSO_3$, $K_4P_2O_7$, $K_3PO_4$, $Na_3PO_4$, $K_2HPO_4$, and $Na_2HPO_4$.

The molecular weight controller includes one or more selected from the group consisting of n-octylmercaptane (NOM), n-dodecylmercaptane (DDM), and t-dodecyl mercaptane (TDDM).

The reactive emulsifier which is used for the preparation of the large-diameter-polybutadiene rubber latex having low gel content includes the emulsifier which is used for preparation of the acrylonitrile-butadiene-styrene latex, as aforementioned.

The acrylonitrile-butadiene-styrene latex which is prepared from the emulsion copolymerization is coagulated with a flocculant such as sulfuric acid, $MgSO_4$, $CaCl_2$, and $Al_2(SO_4)$ in order to obtain a resulting powder. The amount of the solid powder which is coagulated during the reaction is calculated as the equation 1 below, and the formation amount of the film is the film amount which is formed after being allowed to stand for 24 hours.

Amount of the coagulated material (%)=(the amount of the coagulated material formed in a reactor (g)/the total amount of the rubber and the monomer (g))×100  [Equation 1]

The following examples further illustrate the present invention, but the invention is not limited by these examples.

EXAMPLE 1

(Preparation of a Small-diameter-polybutadiene Rubber Latex)

110 parts by weight of ion-exchange water, 100 parts by weight of a 1,3-butadiene monomer, 1.2 parts by weight of potassium rosinate, 2.0 parts by weight of potassium oleic acid, 0.5 parts by weight of $Na_2CO_3$, and 0.3 parts by weight of tertiary dodecyl mercaptane (TDDM) were placed all together in a reactor (autoclave) in order to react the reactants. The reaction was performed for 10 hours, 0.05 parts by weight of tertiary dodecyl mercaptane was added to the reactants, and the reactants were further reacted at 65° C. for 8 hours in order to obtain a rubber latex.

The gel content, swelling index, and particle diameter of the rubber latex were measured as below.

a) Gel content and swelling index

After the rubber latex was coagulated by the deleted acid or metal salt and washed, the washed rubber latex was dried in a vacuum oven at 60° C. for 24 hours in order to obtain a mass of rubber, the mass of rubber was cut in a small piece in order to prepare a test sample of rubber, 1 g of the rubber sample was dissolved in 100 g of toluene, and the sample was kept in a dark room for 48 hours.

Gel content (%)=(the weight of gel/the weight of the test sample)×100  [Equation 2]

Swelling index=the weight of swelled gel/the weight of the total gel  [Equation 3]

b) Particle diameter

The particle diameter of the rubber latex was measured by dynamic laser light scattering with use of Nicomp 370 HPL.

As a result of the measurement of the rubber latex particles as the aforementioned, the average diameter of the rubber latex particles was 1000 Å, the gel content of the rubber latex was 85%, and its swelling index was 18.

(Preparation of the Large-diameter-polybutadiene Rubber Latex Having High Gel Content)

After 100 parts by weight of the small-diameter-rubber latex having 1000 μm of an average diameter, 85% of gel content, 18 of swelling index was placed in a reactor, and stirred at the rate of 10 rpm at 30° C., 2.0 parts by weight of 60% acetic acid was slowly added to the reactants, and the reactants were allowed to stand for 30 minutes in order to obtain a large-diameter-polybutadiene rubber latex. 1.9 parts by weight of 10% potassium hydroxide was added to the large-diameter-rubber latex in order to stabilize the resulting material, and the resulting material was measured as aforementioned.

An average diameter of the large-diameter-rubber latex particles was 3000 Å, the gel content of the rubber latex was 85%, and its swelling index was 17.

(Preparation of a Large-diameter-polybutadiene Latex A Having Low Gel Content)

75 parts by weight of ion-exchange water, 100 parts by weight of 1,3-butadiene monomer, 2.0 parts by weight of potassium rosinate, 0.4 parts by weight of potassium oleic acid, 2.0 parts by weight of $K_2CO_3$, 0.3 parts by weight of TDDM, and 0.2 parts by weight of potassium persulfate as an initiator were placed all together in a reactor substituted with nitrogen gas, and the reactants were polymerized at 70° C. for 10 hours.

When the conversion rate of monomer to polymer was 50%, 0.3 parts by weight of AQUARON HS-10 as an emulsifier was added to the reactants, the temperature was elevated to 75° C., and the reactants were further reacted for 20 hours. When the conversion rate of monomer to polymer was 90%, the reaction was stopped in order to obtain a large-diameter-rubber latex, and the rubber latex was measured as aforementioned.

The average diameter of the large-diameter-rubber latex particles having low gel content was 3000 Å, the gel content of the rubber latex was 67%, and its swelling index was 27.

(Preparation of Graft-polymerized Acrylonitrile-butadiene-styrene Latex)

First, 90 parts by weight of ion-exchange water, 0.5 parts by weight of potassium rosinate, 15.8 parts by weight of styrene, 6.7 parts by weight of acrylonitrile, 0.3 parts by weight of tertiary dodecyl mercaptane, 0.048 parts by weight of sodium pyrophosphate, 0.062 parts by weight of dextrose, 0.001 parts by weight of ferrous sulfate, and 0.08 parts by weight of tertiary butylhydro peroxide were added all together to the large-diameter-polybutadiene rubber latex having 3000 Å of an average diameter of particle, 85% of gel content, and 17 of swelling index, and the large-diameter-polybutadiene rubber latex having 3000 Å of an average diameter of particle, 67% of gel content, and 27 of swelling index at 45° C., and the temperature was elevated to 70° C. for 60 hours, and the reactants were reacted.

Secondly, the mixed emulsifying solution comprising 10 parts by weight of ion-exchange water, 0.5 parts by weight of potassium rosinate, 0.5 parts by weight of AQUARON HS-10 as a reactive emulsifier, 15.8 parts by weight of styrene, 6.7 parts by weight of styrene, 0.048 parts by weight of sodium pyrophosphate, 0.062 parts by weight of dextrose, 0.001 parts by weight of ferrous sulfate, and 0.1 parts by weight of cumenehydro peroxide were added to the reactants continuously for 60 minutes, the temperature was elevated to 80, and the resulting material was aged for 1 hours in order to stop the reaction. The polymerization conversion rate of the obtained rubber latex was 98.9 wt %, the total solid content of the rubber latex was 46.2 wt %, and the content of the coagulated material was 0.023 wt %. 2 parts by weight of aqueous sulfuric acid was added to the resulting material in order to coagulate the resulting material, and washed in order to obtain a powder.

EXAMPLE 2
(Preparation of Graft-polymerized Acrylonitrile-butadiene-styrene)

Acrylonitrile-butadiene-styrene of Example 2 was prepared in the same manner as in Example 1, except that 25 parts by weight of a mixture of 30 parts by weight of the large-diameter-polybutadiene rubber latex having 3000 Å of an average particle diameter, 85% of gel content, and 17 of swelling index, and 25 parts by weight of the large-diameter-polybutadiene rubber latex having 3000 Å of an average particle diameter, 67% of gel content, and 27 of swelling index, according to the composition in Table 1, was used. The polymerization conversion rate of the obtained rubber latex was 99.1 wt %, the total solid content of the rubber latex was 46.3 wt %, and the content of the coagulated material was 0.025 wt %. 2 parts by weight of aqueous sulfuric acid was added to the resulting material in order to coagulate the resulting material, and washed in order to obtain a powder.

EXAMPLE 3
(Preparation of Large-diameter-polybutadiene Rubber Latex B Having High Gel Content)

A large-diameter-polybutadiene rubber latex having 3000 of an average particle diameter, 85% of gel content, and 17 of swelling index was prepared in the same manner as in Example 1.

(Preparation of Large-diameter-polybutadiene Rubber Latex Having Low Gel Content)

A polybutadiene rubber latex was prepared in the same manner as in Example 1, except that AQUARON HS-10 was not added. An average particle diameter of the rubber latex was 3000 Å, its gel content was 69%, and its swelling index was 24.

(Preparation of Graft-polymerized Acrylonitrile-butadiene-styrene)

The mixture of 25 parts by weight of the large-diameter-polybutadiene rubber latex having 3000 Å of an average particle diameter, 85% of the gel content, and 17 of swelling index, and 30 parts by weight of the large-diameter-polybutadiene rubber having 3000 Å of an average particle diameter, 69% of the gel content, and 24 of swelling index was placed in a reactor substituted with nitrogen gas in the same manner as in Example 1, except that 0.2 parts by weight of AQUARON HS-10 was added together with the other reactants at the beginning of the reaction as well as added in the second reaction. The polymerization conversion rate of the obtained rubber latex was 98.6 wt %, the total solid content of the rubber latex was 46.0 wt %, and the content of the coagulated material was 0.031 wt %. 2 parts by weight of aqueous sulfuric acid was added to the resulting material in order to coagulate the resulting material, and washed in order to obtain a powder.

EXAMPLE 4
(Preparation of Graft-polymerized Acrylonitrile-butadiene-styrene Latex)

An acrylonitrile-butadiene-styrene latex was prepared in the same manner as in Example 3, except that 1.0 parts by weight of AQUARON HS-10 was added together with the other reactants, and 1.5 parts by weight of AQUARON HS-10 was further added in the second reaction, according to the composition in Table 1. The polymerization conversion rate of obtained rubber latex was 99.0 wt %, the total solid content of the rubber latex was 46.2 wt %, and the coagulated material content was 0.010 wt %. 2 parts by weight of aqueous sulfuric acid was added to the resulting material in order to coagulate the resulting material, and washed in order to obtain a powder.

Comparative Example 1

An acrylonitrile-butadiene-styrene rubber was prepared in the same manner as in Example 4, except that 0.7 parts by weight of potassium rosinate was added twice in the first and the second reaction. The polymerization conversion rate of the obtained rubber latex was 98.8 wt %, the total solid content of the rubber latex was 46.2 wt %, and the coagulated material content was 0.110 wt %. 2 parts by weight of aqueous sulfuric acid was added to the resulting material in order to coagulate the resulting material, and washed in order to obtain a powder.

The amount of film which is formed on rubber latex and the amount of coagulation of Examples 1, 2, 3, 4, and Comparative Example 1 are represented in Table 1.

TABLE 1

| Composition (a part by weight) | Example 1 | Example 2 | Example 3 | Example 4 | Comparative Example 1 |
|---|---|---|---|---|---|
| In the first reaction | | | | | |
| Ion-exchange water | 90 | 90 | 90 | 90 | 90 |
| Rubber having high gel content | 30 | 25 | 25 | 25 | 25 |
| Rubber "A" having low gel content | 25 | 30 | 0 | 0 | 0 |
| Rubber "B" having low gel content | 0 | 0 | 30 | 30 | 30 |
| Potassium rosinate | 0.5 | 0.5 | 0.5 | 0.5 | 0.7 |
| Reactive emulsifier | 0 | 0 | 0.2 | 1.0 | 0 |
| Styrene monomer | 15.8 | 15.8 | 15.8 | 15.8 | 15.8 |
| Acrylonitrile monomer | 6.7 | 6.7 | 6.7 | 6.7 | 6.7 |
| In the second reaction | | | | | |
| Ion-exchange water | 10 | 10 | 10 | 10 | 10 |
| Potassium rosinate | 0.5 | 0.5 | 0.5 | 0 | 0.7 |
| Reactive emulsifier | 0.2 | 0.2 | 0.2 | 1.5 | 0 |
| Styrene monomer | 15.8 | 15.8 | 15.8 | 15.8 | 15.8 |
| Acrylonitrile monomer | 6.7 | 6.7 | 6.7 | 6.7 | 6.7 |
| Formation of film | Good | Good | Good | Good | Bad |
| Coagulation | Good | Good | Good | Medium | Good |
| Polymerization conversion (%) | 98.9 | 99.1 | 98.6 | 99.0 | 98.8 |
| Total solid content (%) | 46.2 | 46.3 | 46.0 | 46.2 | 46.2 |
| The coagulated material content (%) | 0.023 | 0.025 | 0.013 | 0.008 | 0.110 |

As in Table 1, each acrylonitrile-butadiene-styrene latex rubber of Examples 1, 2, and 3 has high total solid content, and low coagulated material content, the degrees of film formation and coagulated materials were good. The acrylonitrile-butadiene-styrene of Example 4 was prepared with use of more than 2.0 parts by weight of the reactive emulsifier, and it has a degree of coagulated materials worse than the acrylonitrile-butadiene-styrene latex rubber prepared with the use of less than 2.0 parts by weight of the reactive emulsifier. In addition, though the latex rubber of Comparative Example 1 has high total solid content, a large amount of film was formed, and the coagulated material content was high.

According to the method of the present invention, acrylonitrile-butadiene-styrene latex having high total solid content can be prepared by decreasing the amount of film and coagulated materials which are formed during graft-polymerization, and thus the production volume of the latex can increase.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A preparation method of acrylonitrile-butadiene-styrene latex comprising the step of emulsion-polymerizing i) polybutadiene rubber latex comprising a large-diameter-polybutadiene rubber latex having high gel content, that has 2600 to 5000 Å of an average particle diameter, 70 to 95% of a gel content, 12 to 30 of swelling index, and a large-diameter-polybutadiene rubber latex having low gel content, that has 2600 to 5000 Å of an average particle diameter, 60 to 85% of a gel content, 18 to 40 of swelling index; ii) aromatic vinyl compound; and iii) vinyl cyan compound with the addition of a reactive emulsifier.

2. The method according to claim 1, wherein i) 40 to 70 parts by weight of the polybutadiene rubber latex; ii) 15 to 30 parts by weight of the aromatic vinyl compound; and iii) 10 to 25 parts by weight of the vinyl cyan compound were emulsion-polymerized with the addition of 0.01 to 4.0 parts by weight of the reactive emulsifier in order to prepare the acrylonitrile-butadiene-styrene latex.

3. The method according to claim 1, wherein the preparation method comprises steps of
  a) placing 40 to 70 parts by weight of i) the rubber latex; 3.75 to 24 parts by weight of ii) the aromatic vinyl compound monomer; 2.5 to 20 parts by weight of iii) the vinyl cyan compound monomer; and equal to or less than 4 parts by weight of a reactive emulsifier all together in a reactor in order to react the reactants, as the first reaction;
  b) adding 6 to 26.25 parts by weight of ii) the aromatic vinyl compound monomer; 5 to 22.5 parts by weight of ii) the aromatic vinyl compound monomer; 5 to 22.5 parts by weight of the vinyl cyan compound monomer; 0.01 to 4.0 parts by weight of the reactive emulsifier together or continuously to the reactant in a), 30 to 90 minutes after the first reaction of step a), and when the conversion of monomer to polymer ranges from 40 to 90 wt %.

4. The method according to claim 1, wherein the large-diameter-polybutadiene rubber latex having high gel content and the large-diameter-polybutadiene rubber latex having low gel content are mixed in the ratio of 10–50: 50–10.

5. The method according to claim 1, wherein the reactive emulsifier is one or more selected from the group consisting of anionic emulsifier which has an allyl group of polyoxyethylene allylglycidic nonylphenyl ether sulfate; a neutral emulsifier agent which has an allyl group of polyoxyethylene allylglycidic nonylphenyl ether; an anionic emulsifier agent having (meth)acryloyl group; an anionic emulsifier having a propylene group of polyethylene allylglycidic nonyl propenyl phenyl ether ammonium sulfate; and a neutral emulsifier.

6. The method according to claim 1 or claim 3, wherein the emulsion polymerization is performed by adding equal to or less than 4.0 parts by weight of a non-reactive emulsifier further to the reactants.

7. The method according to claim 6, wherein the non-reactive emulsifier is one or more selected from the group consisting of alkylaryl sulfonate, alkalimethylalkyl sulfate, sulfonated alkylester, fatty acid soap, and alkali rosinate.

8. The method according to claim 1, or claim 2, or claim 3, wherein the emulsion polymerization is performed by adding 0.2 to 1.0 parts by weight of tertiary dodecyl mercaptane as a molecular weight controller.

9. The method according claim 1, wherein the emulsion polymerization is performed by adding 0.05 to 0.5 parts by weight of the mixture of one ore more peroxides selected from the group consisting of tertiary butylhydro peroxide, cumenehydro peroxide, diisopropyl benzenehydro peroxide, and persulfate, and one or more reductants selected from the group consisting of sodium formaldehyde sulfoxylate, sodium ethylene diamine tetraacetate, ferrous sulfate, dextrose, sodium pyrolynic acid, and sodium sulfite.

10. The method according to claim 1, wherein the emulsion polymerization is performed at the temperature ranging from 40 to 80° C. for 2 to 7 hours.

11. The method according to claim 1, wherein the large-diameter-polybutadiene rubber latex having high gel content coagulates an small-diameter-rubber latex polymer having an average particle diameter ranging from 600 to 1500 Å, the gel content ranging from 70 to 95%, and swelling index ranging from 12 to 30 with the use of acetic acid.

12. The method according to claim 11, wherein the small-diameter-rubber latex polymer is prepared by a) placing 100 parts by weight of 1,3-butadiene; 1 to 4 parts by weight of a non-reactive emulsifier; 0.1 to 0.6 parts by weight of an initiator; 0.1 to 1.0 parts by weight of an electrolyte; 0.1 to 0.5 parts by weight of a molecular weight controller; and 90 to 130 parts by weight of an ion-exchange water all together in a reactor to react the reactants at the temperature ranging from 50 to 65° C. for 7 to 12 hours; and b) adding 0.05 to 1.2 parts by weight of a molecular weight controller to the reactants of step a) to react the mixture at the temperature ranging from 55 to 70° C. for 5 to 15 hours.

13. The method according to claim 1, wherein the large-diameter-polybutadiene rubber latex having low gel content is prepared by a) placing 50 to 100 parts by weight of a conjugated diene compound monomer; 1 to 4 parts by weight of a non-reactive emulsifier; 0.2 to 1.5 parts by weight of an initiator; 0.5 to 2 parts by weight of an electrolyte; 0.1 to 0.5 parts by weight of a molecular weight controller; and 75 to 100 parts by weight of ion-exchange water all together in a reactor to react the reactants at the temperature ranging from 60 to 75° C. for 4 to 15 hours, as in the first reaction; b) adding the rest of the conjugated diene compound monomer; 0.1 to 1.0 parts by weight of the molecular weight controller all together or continuously to the reactants in order to react the reactants further at a temperature ranging from 70 to 85° C. for 10 to 20 hours, as in the second reaction; c) adding 0.01 to 3.0 parts by weight of the reactive emulsifier to the reactants, when polymerization conversion due to the second reaction in step b) ranges from 30 to 70 wt %; and d) adding a prohibitor to the reactants in order to stop the reaction, when polymerization conversion due to the reaction in step c) ranges from 80 to 95 wt %.

14. The method according to claim 6, wherein the emulsion polymerization is performed by adding 0.2 to 1.0 parts by weight of tertiary dodecyl mercaptane as a molecular weight controller.

* * * * *